United States Patent
Thanner et al.

(10) Patent No.: US 6,199,644 B1
(45) Date of Patent: Mar. 13, 2001

(54) DRILLING TOOL WITH A SUCTION DEVICE

(75) Inventors: Thomas Thanner, Munich (DE); Peter Roth, Grabs; Peter Niedermann, Hauptwil, both of (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/270,628

(22) Filed: Mar. 17, 1999

(30) Foreign Application Priority Data

Mar. 17, 1998 (DE) ............................................. 198 11 437

(51) Int. Cl.$^7$ ...................................................... E21B 21/00
(52) U.S. Cl. ............................................................. 175/207
(58) Field of Search ............................ 175/207, 67, 213, 175/323, 325, 320, 344, 345, 347; 166/241, 242, 293

(56) References Cited

U.S. PATENT DOCUMENTS

| 4,440,450 | * | 4/1984 | Coakley ................................. 299/17 |
| 4,709,462 | * | 12/1987 | Perkin et al. ..................... 175/325 X |
| 4,765,417 | * | 8/1988 | Perkin et al. ........................ 175/347 |
| 4,776,410 | * | 10/1988 | Perkin et al. ........................ 175/325 |

* cited by examiner

Primary Examiner—Robert E. Pezzuto
(74) Attorney, Agent, or Firm—Brown & Wood, LLP

(57) ABSTRACT

A drilling tool, including a housing (1), a suction device (14), and at least one gas spring (2) cooperating with both the housing (1) and the suction device (14) and an operational direction of which is parallel to a drilling direction, with the housing (1) having bore (15) for receiving a piston rod (22) and at least a section of cylinder (21) of the at least one gas spring (2).

9 Claims, 3 Drawing Sheets

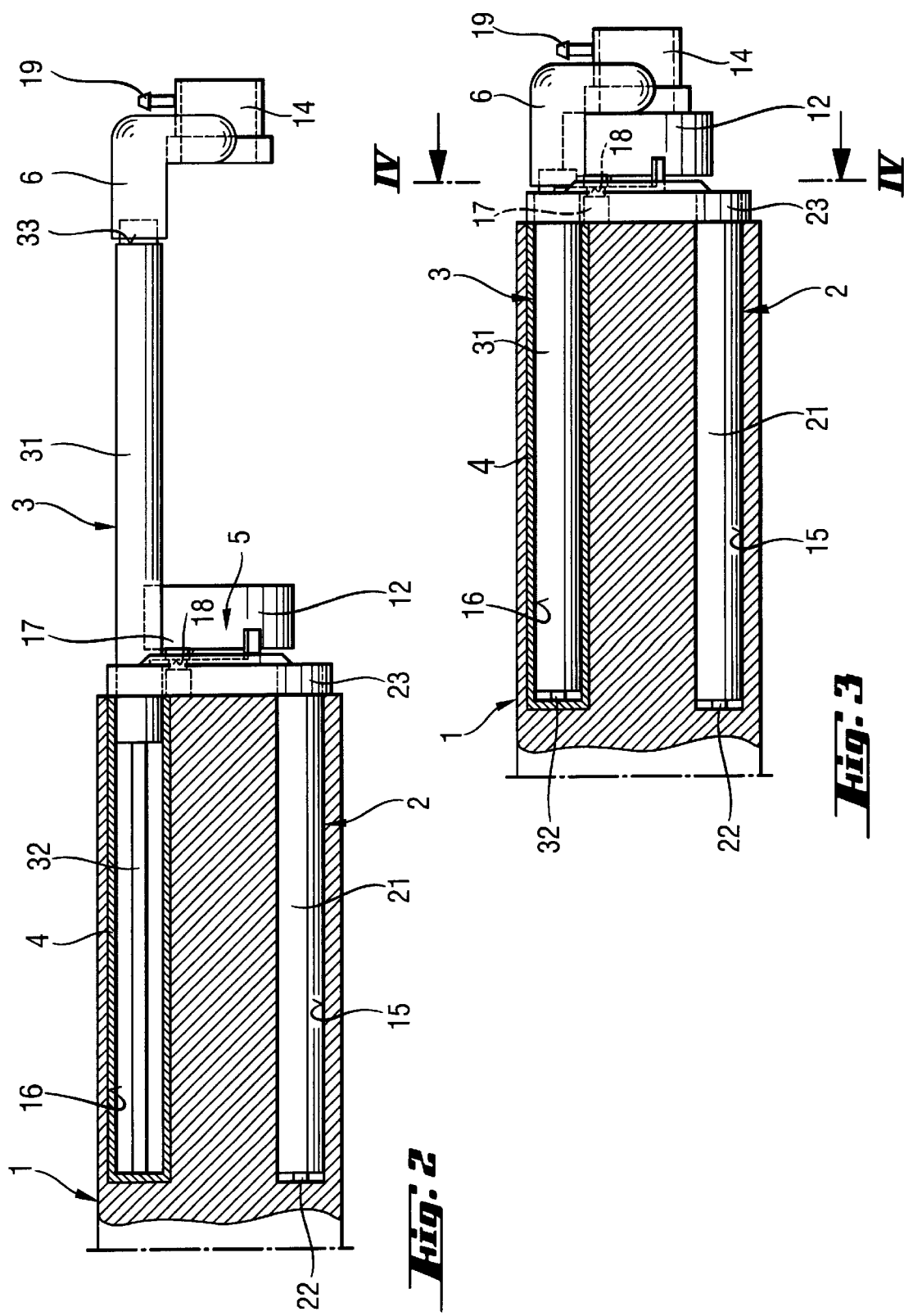

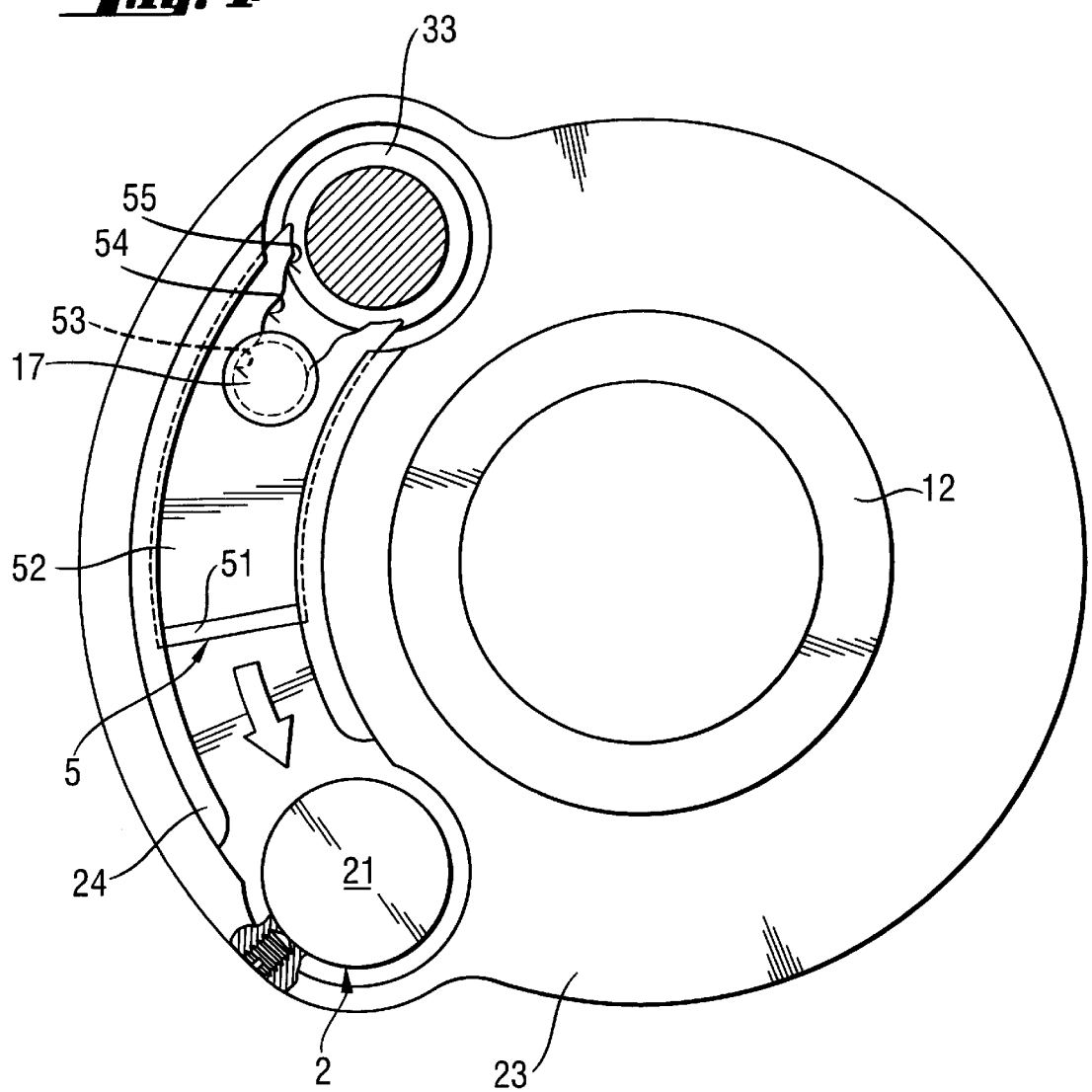

DRILLING TOOL WITH A SUCTION DEVICE

BACKGROUND OF THE INVENTION

1. Field of the Invention

The present invention relates to a drilling tool having a housing, a suction device, and at least one gas spring which cooperates with both the housing and the suction device and an operational direction of which coincides with a drilling direction.

2. Description of the Prior Art

During formation of bores in a constructional component formed of concrete, stone, steel and the like, a cooling medium for cooling the tool and for removing drillings is used. In order to keep the working location as clean as possible, usually suction devices formed as suction heads are used. The suction head surrounds the end, in the drilling direction, region of the drill and seals the working location from outside. The suction head has a suction nipple with which it is connected with an external vacuum-producing apparatus.

German Utility Model DE-GM 8813719 discloses a drilling tool with a suction device and including a gas spring having a cylinder and a piston rod, with the cylinder being secured to the housing of the drilling tool and the free end of the piston rod being connected to the suction device. The piston rod and a surrounding it, sealing region, because of their exposure, are subjected to contamination which results not only in a rapid wear of the sealing region and in damaging of the piston rod surface, but also in malfunction of the entire drilling tool.

Accordingly an object of the present invention is a drilling tool with a suction device in which important parts of the gas spring, which are connected with the suction device, are protected from contamination and have, therefore, a long service life, insuring a functional reliability of the entire drilling tool.

SUMMARY OF THE INVENTION

This and other objects of the present invention, which will become apparent hereinafter, are achieved by providing a drilling tool including a housing, a suction device, and at least one gas spring which cooperates with both the housing and the suction device and an operational direction of which is parallel to a drilling direction. The housing has an opening for receiving the piston rod and at least a section of the cylinder of the at least one gas spring.

The arrangement of the gas spring according to the present invention insures that its piston rod and the sealing region, which surrounds the piston rod and is associated with the cylinder, are completely protected from contamination. In order to prevent the pivotal movement of the suction device from its position, in which it is located coaxially with the drill, there is provided rotation-preventing means. This means can include, e.g., a strip arrange on the cylinder of the gas spring and an elongate groove provided in the housing for receiving the strip.

To provide for a reliable support of the gas spring and a reliable guidance of the suction device, the spring cylinder cooperates with the suction device, and the piston rod extend into bore formed in the housing and is supported against a stop surface provided in the housing bore and facing in the drilling direction.

To provide for a large displacement path of the suction device, which is larger than the most possible stroke of the gas spring, advantageously a second gas spring is provided, which is arranged in tandem with the first spring, with the second spring being connected with the suction device, and with both springs being connected with each other by a connection element.

In order to protect the piston rod of the second spring from contamination, advantageously, the second gas spring is arranged in a receiving sleeve-like member, which projects from the connection element in a direction opposite the drilling direction and which is at least partially received in a second bore provided in the housing.

In order to prevent rotation of the second gas spring relative to the receiving sleeve, which is fixedly connected with the connection element, rotation-preventing means is provided between the second gas spring and the receiving sleeve.

In order to insure a good support of the second spring and a reliable guidance of the suction device, advantageously, the cylinder of the second gas spring is connected with the suction device, and the piston rod of the second gas spring is supported against a stop surface provided in the receiving sleeve and facing in the drilling direction.

In order to be able to insert a drill into the drilling tool, the length of which substantially corresponds to the stoke of the gas spring, it is necessary to inserethat only the second gas spring can be drawn out, with the first gas spring remaining in its drawn-in preloaded condition and located in the first receiving bore formed in the housing. This is preferably achieved by formlockingly connecting the connection element with the housing. For a reliable and easy handling, the formlocking connection of the connection element with the housing is formed by a stop rim associated with the housing and facing in a direction opposite to the drilling direction and a locking element, displaceable perpendicular to the drilling direction.

In order to be able to place the inventive drilling tool in a transportation box, it is necessary that not only the first gas spring but also the second gas spring can be retained n the drawn-in, preloaded position. Advantageously, this is achieved by providing in a second gas spring a locking region facing in the drilling direction and in which the locking element is formlockingly engaged in the drawn-in, compressed position of the second gas spring.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 2 shows a side, partially cross-sectional view of the drilling tool shown in FIG. 1 with only one gas spring being completely drawn out;

FIG. 3 shows a side, partially cross-sectional of the drilling tool show in FIG. 1 with both gas spring s being completely drawn in; and FIG. 4 shows a cross-sectional view along line IV—IV in FIG. 3.

DETAILED DESCRIPTION OF THE PREFERRED EMBODIMENT

Figure 1:
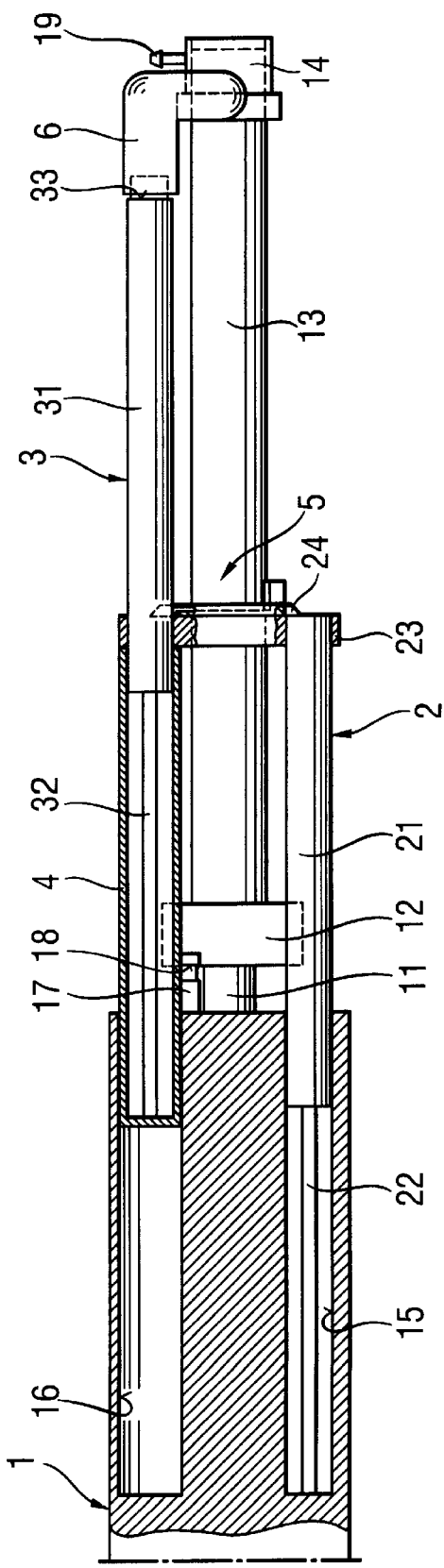
FIG. 1 shows a side, partially cross-sectional view of a portion a drilling tool according to the present invention with a suction device and two, completely drawn out gas springs.

A drilling tool according to the present invention, which is shown in FIGS. 1–3, includes a housing 1, a drive shaft 11, and a chuck 12 for receiving a drill 13. The drill 13 has a tubular carrier body and cutting elements, not shown, provided at a free, in a drilling direction, end of the carrier body.

The drilling tool housing has two, extending parallel to each other, receiving bores 15, 16 having different diameters. Both bores 15, 16 have at least one open end facing in the drilling direction. A first opening 15, which has a smaller diameter, receives a first gas spring 2, with the diameter of the first opening 15 substantially corresponding to the outer diameter of a cylinder 21 of the first gas spring 2. The gas spring 2 has a piston rod 22 which extends into the first bore 15 and is supported against a stop surface of the bore 15 facing in the drilling direction. In the condition shown in FIG. 1, the cylinder 21 partially projects into the first bore 15 to insure a uniform guidance. A portion of the cylinder 21, which projects beyond the bore 15, is fixedly connected at its end, which faces in the boring direction, with a connection element 23 formed, e.g., as a yoke. In a second bore 16, a receiving sleeve-like member 4, is received. The outer diameter of the sleeve-like member 4 substantially corresponds to the inner diameter of the second bore 16. The sleeve-like member 4 serves for receiving the second gas spring 3, and the inner diameter of the sleeve-like member 4 substantially corresponds to the outer diameter of a cylinder 31 of the second gas spring 3. The second gas spring has likewise a piston rod 32 which extends into the sleeve-like member 4 and is supported, at its opposite to the drilling direction end against a stop surface provided in the sleeve-like member 4. In the position shown in FIGS. 1–2, in which the two springs 2, 3 occupy different axial positions relative to the housing 1 of the drilling tool, the cylinder 21 of the second gas spring 3 partially extends into the sleeve-like member 4 for insuring a better guidance.

The end, in the drilling direction, region of the cylinder 31 of the second gas spring 3 is connected, by a connection element 6, with a suction device 14 which is formed as a suction head. The suction device 14 has a suction nipple 19 connectable with an external vacuum-producing device, not shown.

A locking bolt 17 projects from an end of the housing 1 facing in the drilling direction. The looking bolt 17 has, at its end opposite to the drilling direction, a stop rim 18. The distance between the stop rim 18 and the end surface of the housing 1, which faces in the drilling direction, corresponds substantially to a longitudinal extent of the connection element 23. The stop rim 18 is formed by an annular side surface of a groove surrounding the locking bolt 17. The locking bolt 17 extends through a hole formed in the connection element 23 and projects beyond the connection element 13 in the drilling direction. On its surface facing in the drilling direction, the connection element 23 is provided with two guide regions 24 which are arranged substantially opposite each other and extend along a portion of a circumference of two circles having different diameters. Along these guide regions 24, a locking element 5 is displaceable between three different locking position in a plane extending perpendicular to the drilling direction.

The locking element 5 has a substantially plate-shaped base body 52, a manual handle 51 provided at a first free end of the base body 51, and a outwardly opening hole at a second free end of the base body 52. The outwardly opening hole is formed of three, arranged one behind the other, circular through-openings 53, 54 and 55. The through-opening 55, which is located adjacent to the free end of the base body 52, has a diameter larger than the diameter of the locking bolt 17. The two other through-opening 53, 54 have a diameter corresponding to a core diameter of the nut formed on the locking bolt 17.

In a first locking position, both gas springs 2, 3 are in the drawn-in, preloaded position, and the locking bolt 23 abuts the free end of the housing 1 facing in the drilling direction. The through-opening 53 of the locking element 5, which is closest to the handle 51, formlockingly cooperates with the nut provided on the locking bolt 17, and the stop rim 18 of the locking bolt 17 is pressed against the surface of the base body 52 of the locking element 5 facing in the drilling direction. The free end of the locking element 5 projects into the locking region 33 of the second gas spring 3. The locking region 33 is located in a region of the cylinder 31 of the second gas spring 3 and is formed as an annular groove.

In a second locking position, the first gas spring 2 is in its drawn-in, preloaded position, and the second gas spring 3 is in its drawn-out position. The intermediate through-opening 54 formlockingly cooperates with the nut provided on the locking bolt 17, and the stop rim 18 of the locking bolt 17 is pressed against the surface of the base body 52 facing in the drilling direction. The free end of the locking element 5 is offset backward with respect to the cylinder 31 of the second gas spring 3.

In the third locking position, both gas springs 2, 3 are in their drawn-out positions. The connection element 23 which is fixedly connected with the cylinder 21 of the first gas spring 2 is spaced from the free end of the housing 1, and the locking bolt 17 does not extend through the connection element 23. The through-opening 55, which is adjacent to the free end of the locking element 5, is located coaxially with the locking bolt 17.

Both gas springs 2, 3 together with the connection element 23, locking element 5, and the suction head 14, form a unit attachable and detachable from the housing 1 of the drilling tool. To this end, releasable connection means, not shown, is provided.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A drilling tool for forming bores in constructional components formed of concrete stone and similar materials, comprising a housing (1); a drill (13) projecting from the housing (1); a suction device (14) surrounding a free end region of the drill (13); and at least one gas spring (2) connecting the housing (1) and the suction device (14) and an operational direction of which is parallel to the drilling direction, the housing (1) having at least one bore (15) for receiving a piston rod (22) and at least a section of a cylinder (21) of the at least one gas spring (2).

2. A drilling tool according to claim 1, wherein the piston rod (22) of the at least one gas spring (2) is supported against a facing in the drilling direction, stop surface provided in the housing bore (15), and wherein the cylinder (21) of the at least one gas spring (2) cooperates with the suction device (14).

3. A drilling tool according to claim 1, comprising a second gas spring (3) connected in tandem with the at least one gas spring (2) and cooperating with the suction device (14); and a connection element (23) for connecting the two gas springs (2, 3).

4. A drilling tool according to claim 3, further comprising a receiving sleeve-like member (4) for receiving the second gas spring (3), projecting from the connection element (23) in a direction opposite to the drilling direction, and arranged at least partially in a second bore (16).

5. A drilling tool according to claim 4, wherein the second gas spring (3) has a piston rod (32) extending into the sleeve-like member (4) and supported therein against a stop surface formed therein and facing in the drilling direction: and a cylinder (31) of the second gas spring (2) is connected with the suction device (14).

6. A drilling tool according to claim 3, further comprising means for formlockingly connecting the connection element (23) with the housing (1).

7. A drilling tool according to claim 6, wherein the formlockingly connecting means comprises a stop rim (18) arranged in a direction opposite the drilling direction and associated with the housing (1), and a locking element (5) arranged on the connection element (23) and displaceable perpendicular to the drilling direction.

8. A drilling tool according to claim 7, wherein the second gas spring (3) has a locking region (33) facing in the drilling direction, the locking element (5) being, formlockingly engageable with the locking region (33) of the second gas spring (3) in a compressed position of the second gas spring (3).

9. A drilling tool according to claim 3, wherein both gas springs (2, 3) are releasably connected with the housing (1).

* * * * *